(12) United States Patent
Sumiyoshi et al.

(10) Patent No.: US 7,551,340 B2
(45) Date of Patent: Jun. 23, 2009

(54) OPTICAL ELEMENT, OPTICAL DEVICE, MOBILE INFORMATION TERMINAL, AND MANUFACTURING METHOD

(75) Inventors: Ken Sumiyoshi, Tokyo (JP); Koji Mimura, Tokyo (JP)

(73) Assignees: NEC Corporation (JP); NEC LCD Technologies Ltd. (JP)

(*) Notice: Subject to any disclaimer, the term of this patent is extended or adjusted under 35 U.S.C. 154(b) by 365 days.

(21) Appl. No.: 11/461,959

(22) Filed: Aug. 2, 2006

(65) Prior Publication Data
US 2007/0030552 A1  Feb. 8, 2007

(30) Foreign Application Priority Data
Aug. 3, 2005  (JP)  ............................. 2005-224975

(51) Int. Cl.
*G02F 1/03* (2006.01)
(52) U.S. Cl. .................. 359/242; 359/241; 359/238
(58) Field of Classification Search ................. 359/242, 359/241, 238, 239, 245, 248, 259
See application file for complete search history.

(56) References Cited

U.S. PATENT DOCUMENTS 5,784,507 A * 7/1998 Holm-Kennedy et al. ..... 385/31

7,315,667 B2 * 1/2008 Schmidt et al. ............... 385/12

FOREIGN PATENT DOCUMENTS

| JP | 10-197844 | 7/1998 |
|---|---|---|
| JP | 2001-051125 | 2/2001 |
| JP | 2004-252329 | 9/2004 |
| JP | 2005-038746 | 1/2005 |

OTHER PUBLICATIONS

Convertech, vol. 32, No. 6, pp. 6-7 (2004).

* cited by examiner

*Primary Examiner*—Timothy J Thompson
(74) *Attorney, Agent, or Firm*—Dickstein, Shapiro, LLP.

(57) ABSTRACT

A microlouver has, as a basic unit, a light-controlling layer in which a light-absorbing layer and a transparent layer are laminated together, and a plurality of basic units L and S comprising a plurality of types of light-controlling layers having different layer thicknesses or optical constants, disposed in the direction of the layer thickness of the basic units. The array mode of the basic units L and S is determined based on a random number or a sequence-generating rule. For this reason, the microlouver has a large number of frequency components in terms of spatial frequency, and moire fringes that have a specific period and are normally caused by the interference with other optical elements are therefore prevented from occurring.

21 Claims, 10 Drawing Sheets

LAMINATED LAYERS OF BASIC UNITS L AND S
PRODUCED BY GENERATING RULE (b)

DISTRIBUTED FREQUENCY

OPTICAL ELEMENT, OPTICAL DEVICE, MOBILE INFORMATION TERMINAL, AND MANUFACTURING METHOD

BACKGROUND OF THE INVENTION

1. Field of the Invention

The present invention relates to an optical element in which the viewing angle can be changed, an optical device, a mobile information terminal, and a manufacturing method for a microlouver that is used as an optical element.

2. Description of the Related Art

Liquid crystal display apparatuses that can be viewed from a wide angle have come into practical use in conjunction with technological advancement in recent years. Also, mobile information terminals having a liquid crystal display apparatus continue to become more pervasive. In such mobile information terminals, a wide viewing angle is desirable when acquired information is to be shared with and viewed by others. However, in mobile information terminal applications, there may be cases in which the screen in is not meant to be viewed by others. It is therefore desirable to have the capability of selecting a wide viewing angle or a narrow viewing angle in accordance with service conditions.

An LCD that satisfies the above-described needs is a microlouver (micro-lens sheet) in the form of a film that is laminated to the display screen as described in Japanese Laid-open Patent Application No. 10-197844 (paragraph 0035) and Convertech (vol. 32, no. 6, pp. 6 to 7, 2004). Japanese Laid-open Patent Application No. 10-197844 describes an approach whereby a microlouver that can widen the viewing angle is mounted on the display screen only when a wide viewing angle is used, and the micro-lens sheet is removed when a narrow viewing angle is used.

Figure 1:
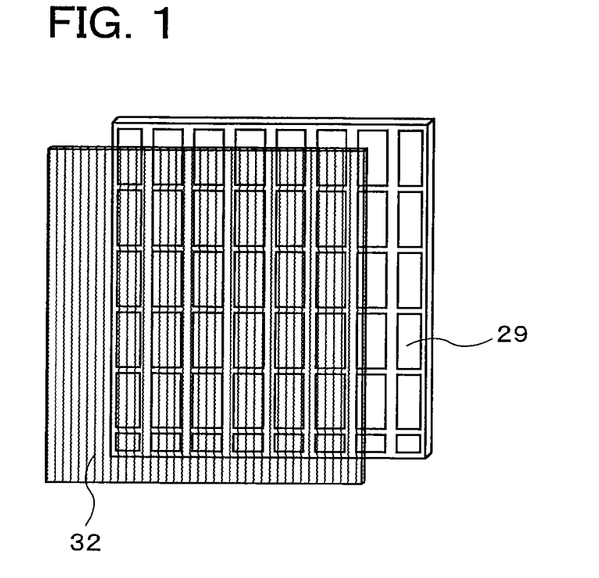
FIG. 1 is a view of a display apparatus provided with the optical element (microlouver) according to the first embodiment of the present invention.

A microlouver 32 is laminated onto the display panel 29, as shown in FIG. 1. A conventional microlouver 32 has light-absorbing and transparent layers alternately disposed at regular intervals in the film surface. In the particular case that the light-absorbing layers extend in the vertical direction of the screen, the light emission in the horizontal direction of the screen is reduced. For this reason, persons positioned in the horizontal direction of the screen cannot view information on the screen.

However, the display apparatus described in Japanese Laid-open Patent Application No. 10-197844 has the following problems. As described above, the microlouver has an alternating structure of light-absorbing and transparent layers at a constant period on the surface of the film. Conversely, when a thin display having a constant pixel pitch is used as the display apparatus, a phenomenon referred to as "Moire fringes" occurs due to interference between the constant period of the microlouver and the pixel pitch of the thin display.

This phenomenon is described with reference to FIG. 2. The microlouver has a spatial arrangement such as that shown in the lower left portion of FIG. 2 because the microlouver has light-absorbing layers 30 and transparent layers 31 disposed at a constant period. The center lower portion of FIG. 2 describes the spatial arrangement in terms of spatial frequency. In particular, since the microlouver has a repeating period in a single direction, a regular peak arrangement is observed within the spatial frequency shown in the center lower portion of FIG. 2. The peak arrangement coordinates correspond to the positions of the integral multiples of the vector Pl. In addition, the magnitude of vector Pl is equal to the reciprocal of the microlouver period L.

Examples of a thin display include a liquid crystal display apparatus, an organic EL display, and a plasma display. These displays are configured with pixels 33 arranged at regular spatial intervals. For this reason, the displays will have regular two-dimensional peaks in terms of spatial frequency, as shown in the center upper portion of FIG. 2. The coordinates of these peaks are expressed by the position $n\cdot Px+m\cdot Py$ of the integral multiple of the vectors Px and Py.

Figure 2:
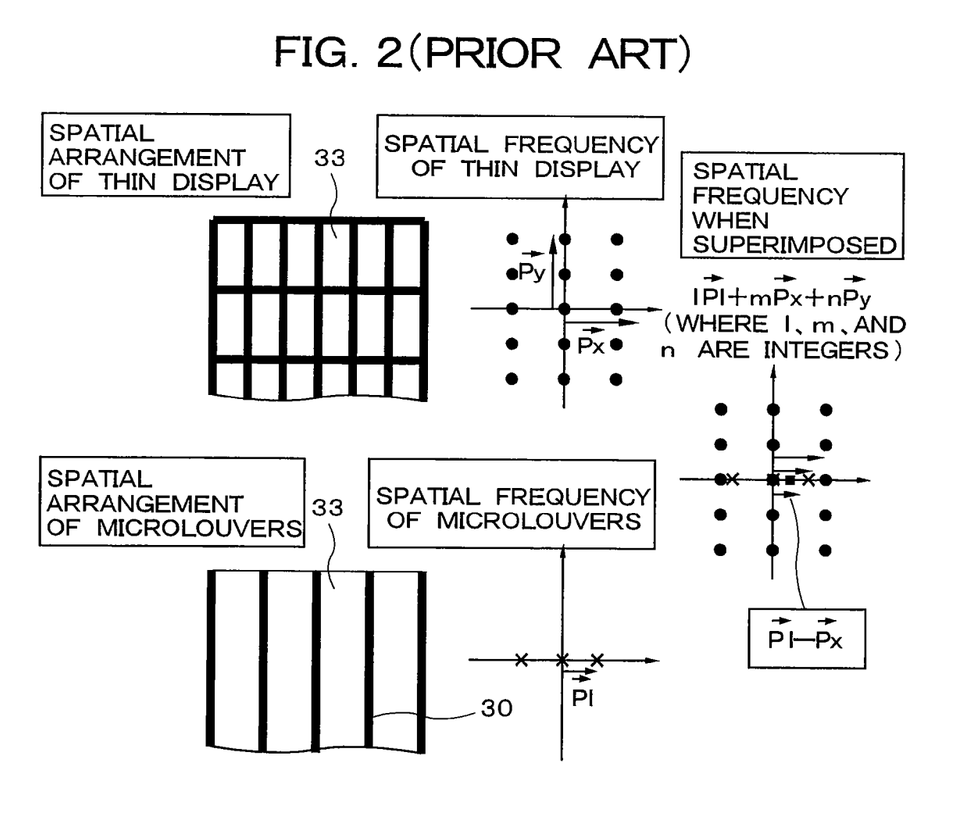
FIG. 2 is a diagram describing the occurrence of moire in the prior art.

The right-hand portion of FIG. 2 shows the result of superimposing the microlouver and the thin display in the manner described above. The position of each peak is equal to the integral multiple $1\cdot Pl+n\cdot Px+m\cdot Py$ of Pl, Px, and Py. Among the combinations of the three integers, the integer having the shortest length of $1\cdot Pl+n\cdot Px+m\cdot Py$ has the largest period. For example, it is apparent that P1-Px in the right-hand portion of FIG. 2 is the shortest distance from the origin and that the period is a long period.

As described above, a long periodic structure is produced by superimposing the microlouver and the pixel pitch. This is known as a moire stripe.

The above-described condition occurs in the same manner in the liquid crystal display apparatus of Japanese Laid-open Patent Application No. 10-197844. When the PDLC layer is in a scattering state, interference between the microlouver period and the pixel pitch of the display screen is masked by the scattering of the PDLC layer and Moire fringes cannot therefore be noticed. However, when the PDLC layer is in a transparent state, interference between the two is generated, and Moire fringes can be noticed.

Moire fringes such as those described above are not limited to microlouvers, but are a phenomenon that is widely observed between periodic structures. Widely used in a backlight for a liquid crystal display apparatus, for example, is a structure in which a prism sheet is used for improving front surface brightness. The prism sheet has regular prism rows. For this reason, similar Moire fringes are produced when the prism rows and liquid crystal display panel are superimposed. A diffusion plate (diffuser) is ordinarily inserted between the prism sheet and the liquid crystal display panel in order to avoid such a situation. It is for this reason that the effect of improving the front surface brightness is typically diminished by the diffusion plate.

The problems described below also occur in a liquid crystal projector. The liquid crystal light bulb that forms liquid crystal projector images normally has a regular pitch. Display light projected by the liquid crystal bulb is projected onto a screen. In such a case, the surface of the screen is given a geometric structure to control the diffusion direction of the display light. When the geometric structure takes a periodic arrangement, Moire fringes are generated at the pixel pitch of the liquid crystal light bulb.

As described above, Moire fringes are a widely problematic phenomenon in display information bodies having a fixed pixel pitch.

In view of the above, Japanese Laid-open Patent Application No. 2001-51125 (paragraph 0009) discloses a backlight for a liquid crystal display apparatus in which convex or concave dots are disposed in parallel or in series while kept parallel to the light-incident end face portion on the front or back surface of the light guide plate. The serial or parallel intervals are obtained by a procedure in which the distance from the light-incident end face portion to the first serially or parallelly disposed dots is divided by the square root of 1.5 to 1.8, and by dividing the immediately preceding interval distance by the square root of 1.5 to 1.8. Luminescent lines can thereby be prevented.

Japanese Laid-open Patent Application No. 2004-252329 (abstract) discloses a reflective plate for a reflective liquid crystal display apparatus in which a concavo-convex surface comprising a plurality of concavities is formed on the surface of the reflective layer, and groups of concavities and convexities are randomly disposed in order to prevent the occurrence of Moire fringes.

Japanese Laid-open Patent Application No. 2005-38746 (paragraphs 0007 and 0008) discloses a backlight in which an excident-light control plate is disposed between the light guide body and the liquid crystal panel, and a plurality of convexities are disposed over the entire excident-light control plate at random intervals so that the occurrence of Moire fringes is prevented when light from a light source is incident to the side surface of a light guide body, and planar light from the excident plane of the surface of the light guide body is incident to the liquid crystal panel disposed above the light guide body.

The inventions disclosed in Japanese Laid-open Patent Application Nos. 2001-51125, 2004-252329, and 2005-38746 prevent Moire fringes, but they represent techniques for preventing Moire fringes produced by light incident from the backlight to the liquid crystal panel, or by light incident from the reflective layer of the reflective liquid crystal display apparatus to the liquid crystal layer. The prior art does not prevent Moire fringes generated by providing microlouvers that vary the viewing angle, as in the present invention. The objects of the present invention cannot be solved when such prior art is applied to a microlouver.

SUMMARY OF THE INVENTION

An object present invention is to provide an optical element capable of preventing moire striping from being caused by interference between optical elements that control the viewing angle, and to provide an optical device, a mobile information terminal, and a method for manufacturing the microlouver.

The optical element according to the first aspect of the present invention comprises a light-controlling layer in which a light-absorbing layer and a transparent layer are laminated together as a basic unit; a plurality of basic units comprising a plurality of types of light-controlling layers having different layer thicknesses or optical constants, disposed in the direction of the layer thickness; and front and back surfaces disposed in the direction orthogonal to the direction of the layer thickness and used as light incident and excident planes, wherein an array mode of the plurality of basic units is determined based on a sequence-generating rule.

The optical element according to the second aspect of the present invention comprises a light-controlling layer in which a light-absorbing layer and a transparent layer are laminated together as a basic unit; a plurality of basic units comprising a plurality of types of light-controlling layers having different layer thicknesses or optical constants, disposed in the direction of the layer thickness; and front and back surfaces disposed in the direction orthogonal to the direction of the layer thickness and used as light incident and excident planes, wherein an array mode of the plurality of basic units is determined based on a random number.

The optical element according to the third aspect of the present invention comprises a light-controlling portion comprising a two-dimensional shape composed of a light-absorbing layer and a transparent layer as a basic unit; a plurality of basic units comprising a plurality of types of light-controlling portions having different sizes or optical constants, arranged on a flat surface orthogonal to the two-dimensional shape on the basis of a non-periodic two-dimensional filler algorithm; and front and back surfaces disposed in the direction parallel to the flat surface and used as light incident and excident planes.

These optical elements are microlouvers, for example.

The optical device according to the fourth aspect of the present invention is obtained by laminating any of the above-described non-periodic optical elements and an optical element having a periodic light-controlling layer or light-controlling portion.

The optical device according to the fifth aspect of the present invention comprises any of the above-described non-periodic optical elements and a spatial optical modulator having a periodic pixel structure in which the optical elements are laminated together.

The optical device according to the sixth aspect of the present invention comprises an optical screen consisting of any of the above-described optical elements and a spatial optical modulator having a periodic pixel structure in which the emitted light thereof is projected on the optical screen.

IN the optical device according to the seventh aspect of the present invention, a transparent/scattering switching element is inserted between the above-described microlouver and a spatial light modulator having a periodic pixel structure.

In the mobile information terminal according to the eighth aspect of the present invention, any of the above-described optical devices is mounted.

The method of manufacturing a microlouver according to the ninth aspect of the present invention comprises forming, as a basic unit, a light-controlling layer in which a light-absorbing layer and a transparent layer are laminated together; laminating a plurality of basic units, each comprising a plurality of types of light-controlling layers that have different layer thicknesses, in an array mode determined based on a sequence-generating rule in the layer thickness direction thereof to form a block body; and making the film thinner by slicing the block body in the direction orthogonal to the layer thickness direction.

The method of manufacturing a microlouver according to the tenth aspect of the present invention comprises forming, as a basic unit, a light-controlling layer in which a light-absorbing layer and a transparent layer are laminated together; laminating a plurality of basic units, each comprising a plurality of types of light-controlling layers that have different layer thicknesses, in an array mode determined based on a random number in the layer thickness direction thereof to form a block body; and making the film thinner by slicing the block body in the direction orthogonal to the layer thickness direction.

In the optical element of the present invention and an optical device in which the optical element is mounted, a light-controlling layer is used as a basic unit in which a light-absorbing layer and a transparent layer are laminated together, a plurality of basic units comprising a plurality of types of light-controlling layers in which the layer thicknesses or optical constants are different are disposed in the direction of the layer thickness of the basic units, and an array mode of the plurality of basic units is determined based on a sequence-generating rule, or is determined based on a random number. Therefore, Moire fringes can be prevented and the viewing angle can be made narrow by the light-controlling layers. When the light-absorbing layers extend in the vertical direction, for example, the emission of light in the horizontal direction can be reduced, and persons positioned in the horizontal direction can be prevented from viewing the screen information.

DESCRIPTION OF THE PREFERRED EMBODIMENTS

Embodiments of the present invention are described in detail below with reference to the attached diagrams. FIG. 1 is a view of a microlouver 32 mounted on a display panel 29 in the first embodiment of the present invention. The microlouver 32 of the present embodiment is configured so that light-absorbing layers and transparent layers are disposed in an irregular and alternating manner.

Figure 3:
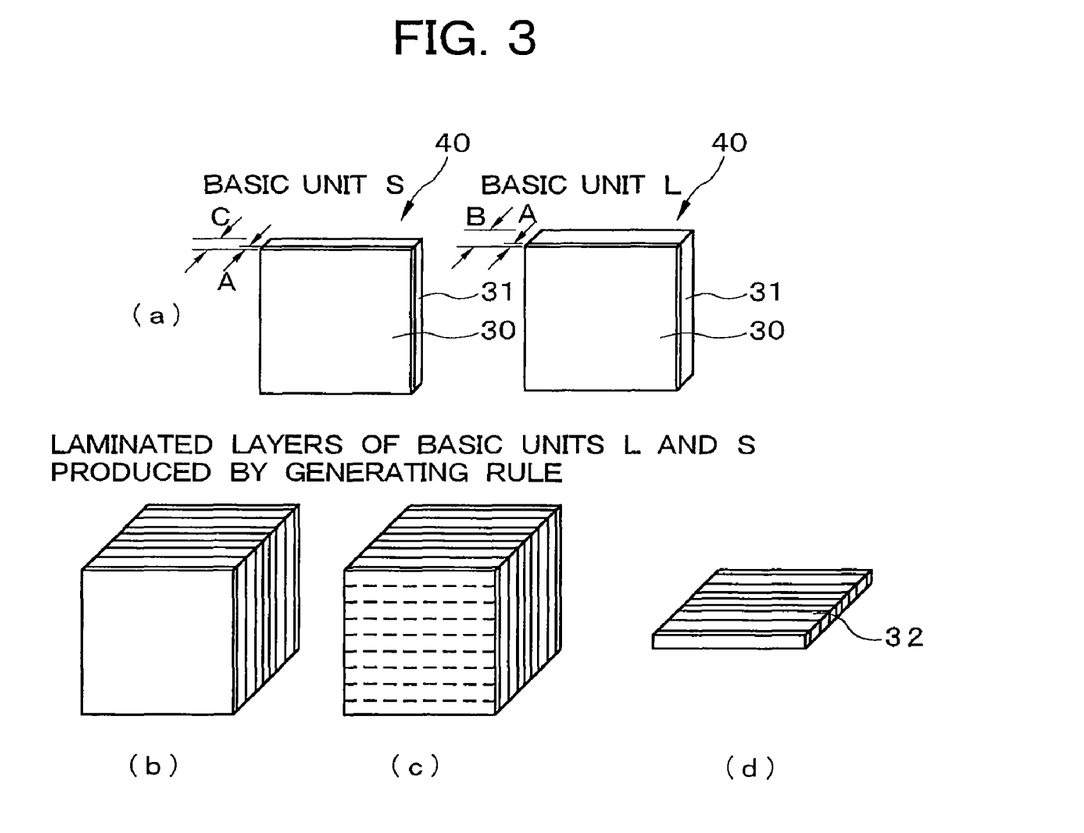
FIGS. 3A to 3D are views showing the order of the manufacturing steps for the microlouver of the first embodiment of the present invention.

FIGS. 3A to 3D are views showing the method of manufacturing the microlouver. First, a plurality of two types of light-controlling layers 40 in which a light-absorbing layer 30 is laminated on a transparent layer 31 are prepared, as shown in FIG. 3A. The light-controlling layer 40 of the basic unit L has a light-absorbing layer 30 with a thickness of A, and a transparent layer 31 with a thickness of B. The light-controlling layer 40 of the basic unit S has a light-absorbing layer 30 with a thickness of A and a transparent layer 31 with a thickness of C (C≠B).

The light-controlling layers 40 of the basic units L and S are laminated in a mode produced by a sequence-generating rule, as shown in FIG. 3B. The basic units L and S are laminated in the order of LSLLSLSL, and so forth, in accordance with the sequence shown in Eq. 6 described hereinafter. The laminates are thereafter heated and fused to form a block of laminates. A microlouver 32 in the form of a sheet is obtained, as shown by FIG. 3D, by slicing the block in the layer thickness direction of the light-controlling layer 40, as shown in FIG. 3C. In the microlouver 32, the front or reverse surface sliced in the direction of the layer thickness of the light-controlling layer 40 is the light incident surface, and the other surface is the light excident surface. In other words, the sliced surface is aligned in the direction orthogonal to the direction of the layer thickness of the light-controlling layer 40; the front surface or reverse surface of the microlouver 32, which is the sliced surface, is the light incident surface; and the other surface is the light excident surface. In the microlouver 32, the angle of the light rays in the light-restricting direction can be adjusted by adjusting the slice thickness. The angle of the light rays can also be estimated from the total number of basic units L and basic units S.

The sheet-shaped microlouver 32 fabricated in the manner described above has a structure such as that shown in FIG. 4. The thicknesses of the basic units are different because the thicknesses of the transparent layers are different in the basic units L and S. The microlouver 32 is laminated on the liquid crystal display panel 29, as shown in FIG. 2. In the liquid crystal display panel 29, the pixels are arrayed at equal intervals in the row and column directions, i.e., in the form of a grid. When the light-absorbing layers are aligned in the vertical direction in the diagram, the viewing angle range in the horizontal direction of the diagram can be controlled. Also, Moire fringes are not generated by the pixel pitch of the liquid crystal display panel 29 because the microlouver 32 is formed from laminated bodies composed of light-absorbing layers 30 and transparent layers 31 that have different thicknesses.

Figure 5:
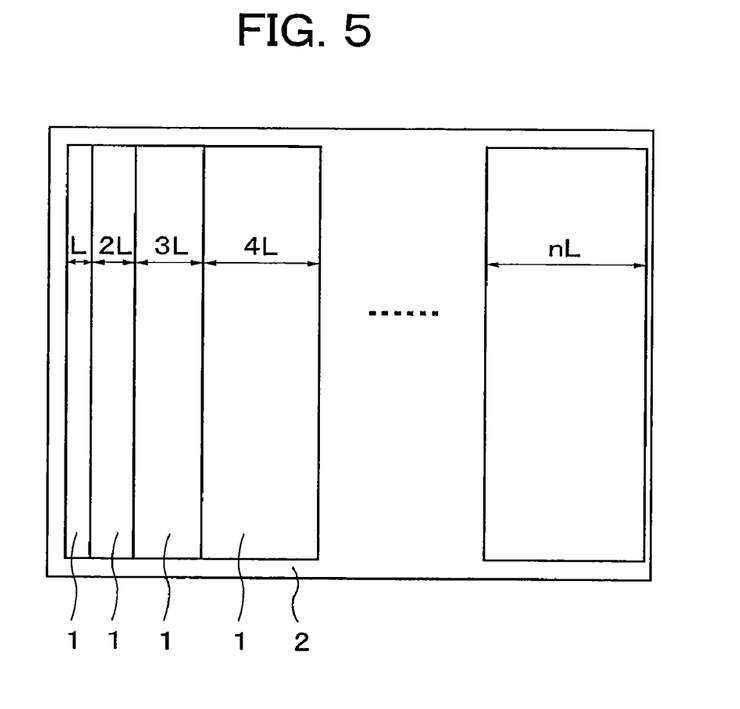
FIG. 5 is a schematic plan view showing the array method of the basic units of another optical element.

Described next is the mode of laminating basic units having different types of optical elements (microlouver 32) according to the present invention. A plurality of light-controlling layers 1 that refract, absorb, reflect, and have other optical effects on the incident light are disposed on a substrate surface 2, as shown in FIG. 5, and each of the light-controlling layers 1 is composed of two or more types of basic units. In FIG. 2, the light-controlling layers 1 are shown as being elongated in the vertical direction of the diagram. However, the shape is not required to be elongated in the vertical direction, as described hereinafter. In principle, the substrate surface of the optical elements may be filled with two or more types of basic units. In other words, the configuration may be a simple two-dimensional array. The basic units may be configured with different sizes but identical optical constants, or different optical constants but identical sizes. For the sake of simplicity, described below with reference to FIG. 5 is a case in which the optical constants are the same but the sizes are different, and in which the basic units are elongated in the vertical direction.

Figure 6:
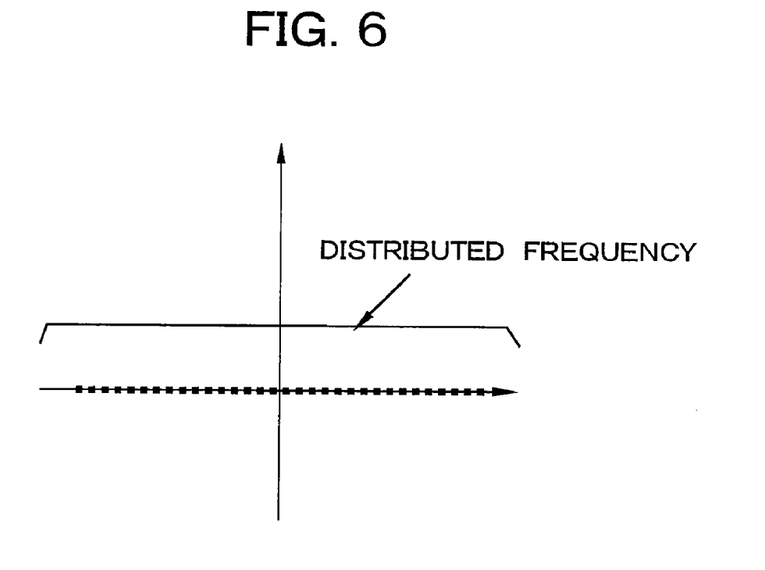
FIG. 6 is a spatial frequency diagram describing the effect of the optical element.

In FIG. 5, L is the size of the smallest basic unit, and the size of the basic units increases in accordance with the natural numbers 1L, 2L, 3L, and so forth. The maximum size of the basic units is nL in a range determined by the external size of the optical element. The optical element in FIG. 5 is therefore composed of n types of basic units. In this case, the spatial frequency of the array has a large number of peaks that are aligned in the array direction of the basic units, as shown in FIG. 6. The interval of these peaks is not constant.

When the optical element configured in the manner described above is superimposed on an optical element having a constant period, peaks having an irregular interval similarly appear in the spatial frequency, as shown in FIG. 5. In this case, an observer simultaneously sees a large number of peaks because a large number of frequencies appear in the area in the vicinity of the origin of the spatial frequencies. For this reason, Moire fringes of the above-described constant pitch cannot be observed.

Figure 7:
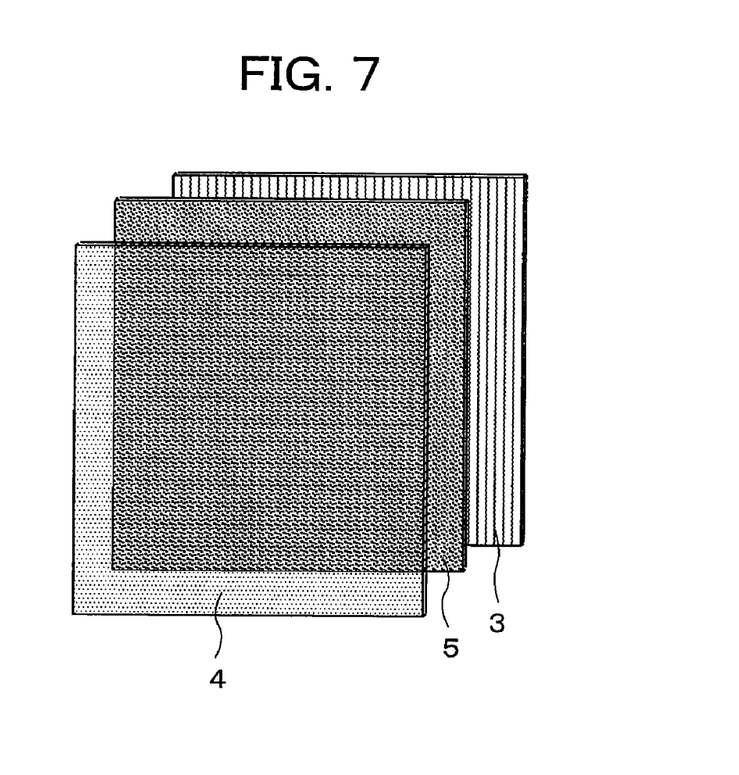
FIG. 7 is a schematic view of an optical device in which the optical element of the present invention is combined with an optical element having a constant period.
Figure 8:
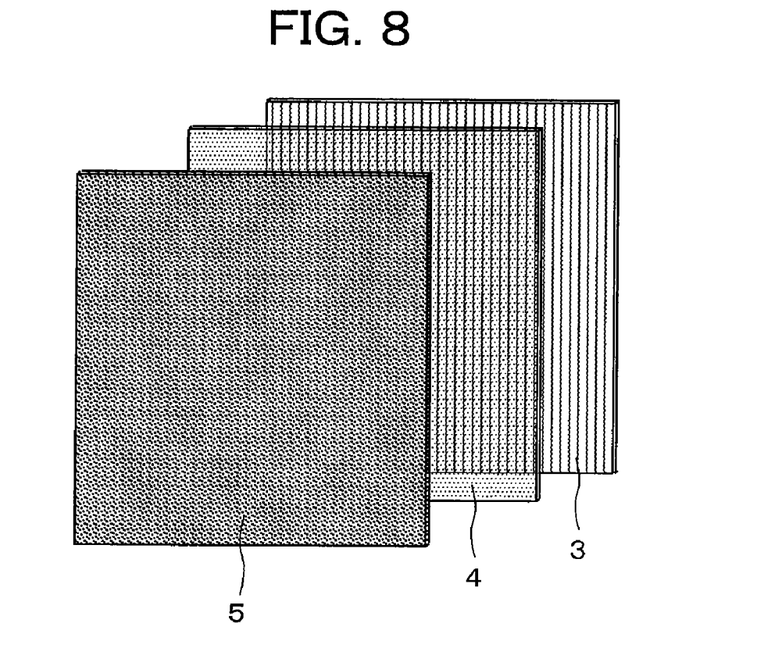
FIG. 8 is a schematic view of an optical device in which the optical element of the present invention is combined with an optical element having a constant period.

The same effect can also be obtained when an optical element 5 having an irregular period as shown in FIG. 5 is disposed between the optical elements 3 and 4 having a plurality of constant periods, as shown in FIG. 7. Also, a distinct constant period cannot be observed by an observer and Moire fringes can be eliminated even when the order of superimposition is changed and the optical element 5 with an irregular period, the optical element 4 with a constant period, and the optical element 3 with a constant period are disposed in the stated order, as shown in FIG. 8.

The screen of a liquid crystal display, an organic EL display, a plasma display, or another spatial modulator comprises a large number of isolated pixels. These displays are thin displays and are often used in combination with other thin optical components. A liquid crystal display may, for example, be used in combination with backlight components and various film components. When structures having a constant period are present in these components, Moire fringes are generated by interference with the period of the liquid crystal display pixels. Such Moire fringes can be dramatically reduced by including, as components, optical elements comprising two or more types of basic units described in the present invention.

On the other hand, a fewer number of basic units comprising optical element is preferred in terms of facilitating the fabrication of an optical element. In view of the above, reducing the number of basic units shown in FIG. 5 will be considered next. The total distance of the array shown in FIG. 5 is given in the following expression, where nL is the size of the largest basic unit.

$$1L+2L+3L+\ldots nL=(\tfrac{1}{2})n(n+1)L$$

The following Eq. 1 is obtained when the external size of the optical element is A.

$$(\tfrac{1}{2})n(n+1)L=A \qquad [\text{Eq. 1}]$$

As described above, the integer n and the smallest size L of the basic units can be used as design parameters. In this case, the integer n is determined by the size A of the external size. Therefore, a large integer n is required when a large external size is used. In other words, the sizes of a large number of basic units must be prepared. If the integer n is sufficiently large, an approximation expression in Eq. 2 below can be derived from Eq. 1. In the following expression, the symbol "~" indicates an approximation expression.

$$n^2 \sim 2(A/L) \qquad [\text{Eq. 2}]$$

Figure 9:
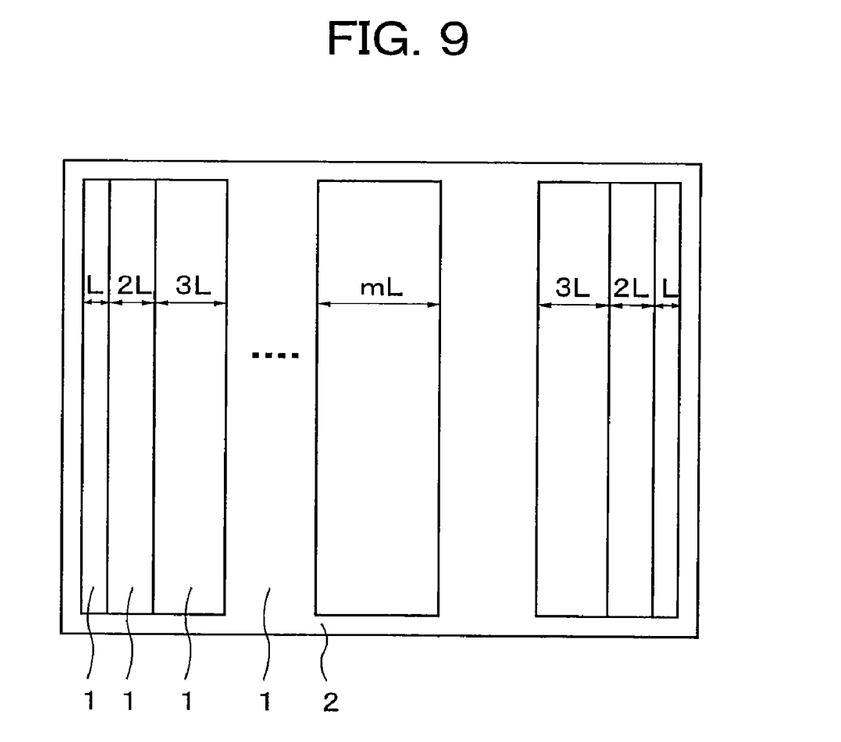
FIG. 9 is a schematic plan view of the array method of the basic units of another optical element.

An array such as that shown in FIG. 9 is also possible in practical terms. The array is $1L, 2L, \ldots, mL, (m-1)L, \ldots, 2L, 1L$. In this case, the relationship between the total distance of the array and the external size A of the optical elements is expressed in Eq. 3.

$$(\tfrac{1}{2})m(m+1)L+(\tfrac{1}{2})(m-1)mL=A \qquad [\text{Eq. 3}]$$

In a similar manner, the integer m and the smallest size L of the basic units can be used as design parameters. In this case, if the integer m is sufficiently large, an approximation expression in Eq. 4 below can be obtained.

$$m^2 \sim (A/L) \qquad [\text{Eq. 4}]$$

When Eqs. 2 and 4 are compared based on the above, it is apparent that optical elements of the same external size A can be fabricated using a smaller integer m. In other words, optical elements can be fabricated using a fewer number of types of basic units.

Figure 10:
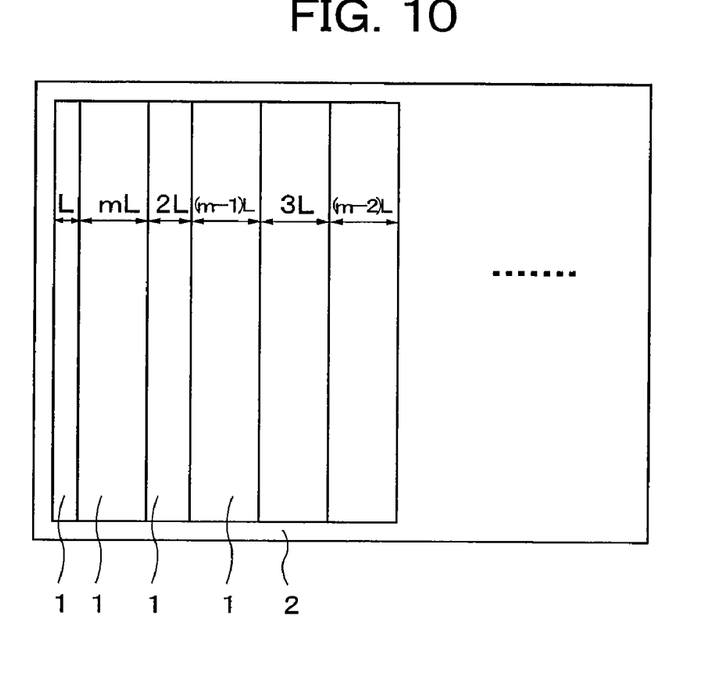
FIG. 10 is a schematic plan view of the array method of the basic units of another optical element.

Furthermore, in the case of an array such as that shown in FIG. 10, optical performance within the plane of the optical elements can be made uniform because small-sized basic units L, 2L, 3L, and so forth can be combined with large-sized basic units mL, (m−1)L, (m−2)L, and so forth.

Figure 11:
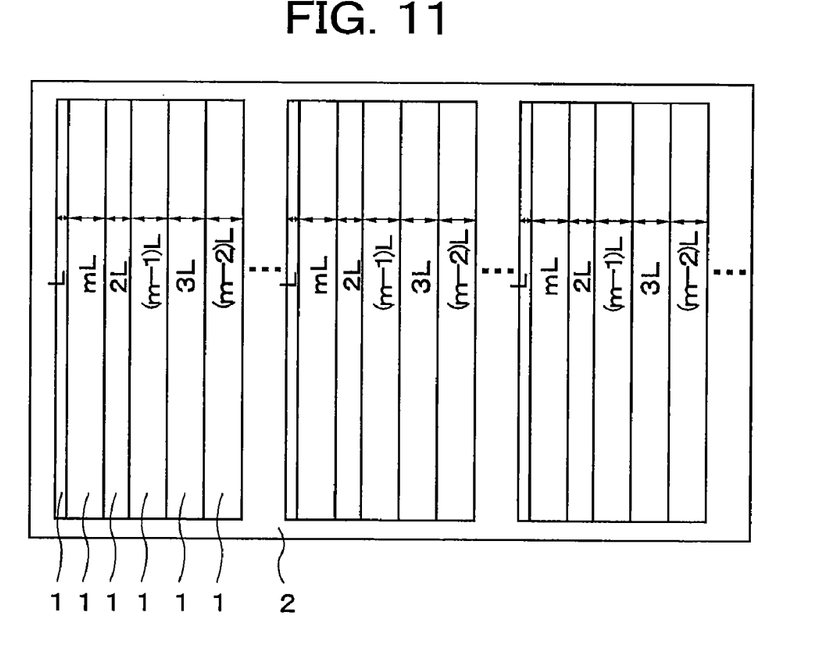
FIG. 11 is a schematic plan view of the array method of the basic units of another optical element.

Also possible is an array such as that shown in FIG. 11. This array comprises a plurality of arrays of basic units composed of L, mL, 2L, (m−1)L, 3L, (m−2)L, and so forth. A comparison of FIGS. 10 and 11 indicates that the number of basic units in FIG. 11 less than the number in FIG. 10. For this reason, the array mode of FIG. 11 can be composed of optical elements that have a fewer number of basic units.

Figure 12:
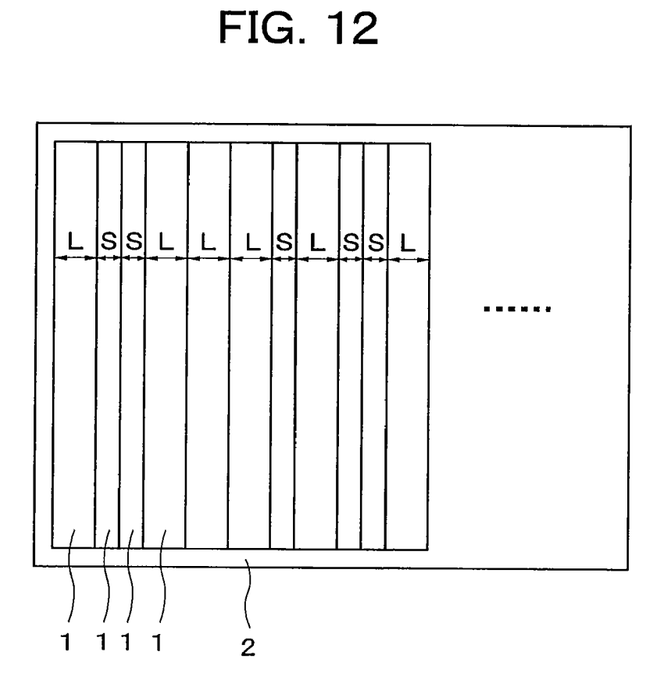
FIG. 12 is a schematic plan view of the array method of the basic units of another optical element.

Described next with reference to FIG. 12 is a case in which the configuration has a fewer number of basic units. In FIG. 12, two types of basic units (L and S) are used. A random number is used to determine whether to use an L or an S when a basic unit. A random number having a value between 0 and 1 is generated, for example. An L is assigned when the value is less than 0.5, and an S is assigned when the value is 0.5 or higher. The sequence shown in Eq. 5 is determined, for example, by repeating the above operation.

$$\text{LSSLLLSLSSL} \qquad [\text{Eq. 5}]$$

The optical elements can be constituted in the manner shown in FIG. 12 on the basis of the sequence. Thus, Moire fringes with a marked constant period are not generated as described above because an optical element having randomly arranged light-controlling layers can be obtained.

The probability that an L will occur in an optical element is about 0.5, and the probability that an S will occur in an optical element is also about 0.5. The average optical performance can therefore be freely designed by assigning a basic unit after a random number has been generated.

Figure 13:
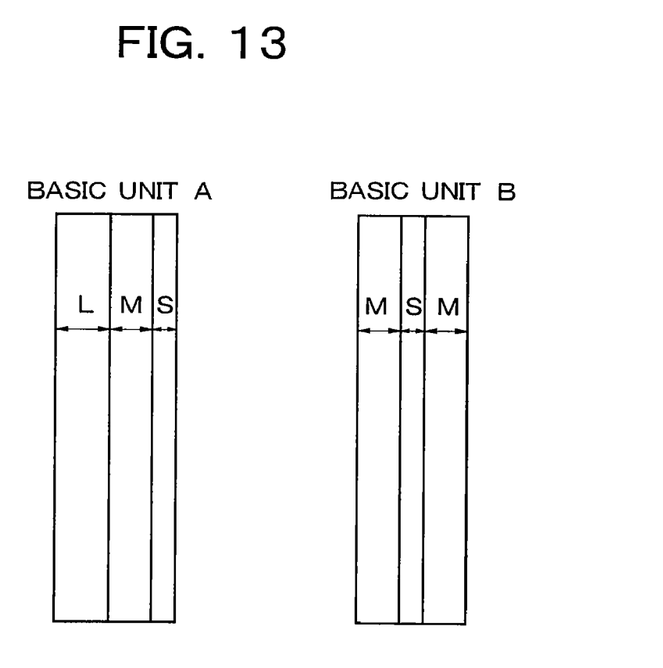
FIG. 13 is a schematic plan view of the array method of the basic units of another optical element.

Also, basic units A and B are composites of light-controlling layers, as shown in FIG. 13, and a random number can be used to arrange the basic units A and B. In FIG. 13, the basic units A and B are laminates composed of three light-controlling layers L, M, S and three light-controlling layers M, S, M, respectively, i.e., A=(L, M, S) and B=(M, S, M). Therefore, when a random number is used to produce a sequence ABA A . . . , the sequence LMSMSMLMSLMS . . . is ultimately obtained. An optical element can thus be obtained comprising the basic units A and B, which are composites of three types of basic units, i.e., L, M, and S.

It is also possible to use another method of assigning basic units rather than a random number. A non-periodic sequence can be obtained by using an algorithm for generating a sequence known as a Fibonacci series. The first and second generations of sequences are {S} and {L}, respectively. The third and subsequent generations are obtained using substitutions rules L⟹LS and S⟹L. As a result, the sequence of each generation shown in Eq. 6 can be obtained.

$$\text{S, L, LS, LSL, LSLLS, LSLLS, LSL,} \qquad [\text{Eq. 6}]$$

This sequence is known to be a non-periodic sequence. The generation frequency ratio of L and S after infinite repetition is known as the golden ratio (1.68 . . . ).

Figure 4:
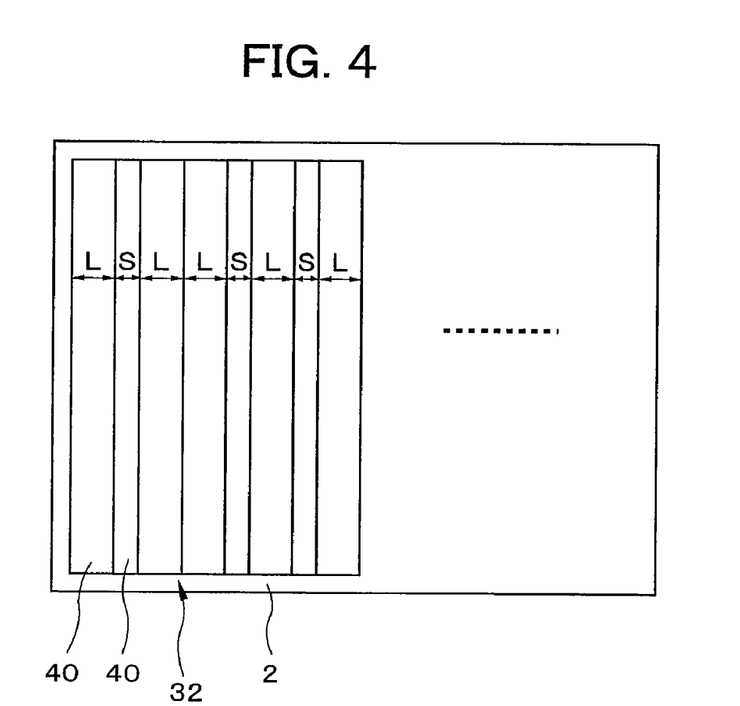
FIG. 4 is a schematic plan view showing the array mode of the basic units in the optical element of the first embodiment of the present invention.

The optical element shown in FIG. 4 can be produced using the algorithm of Eq. 6. When this algorithm is used, the continuously repeating portion contains only an LL number of continuous repetitions as the maximum possible number of repetitions, as is apparent from Eq. 6. When a random number is generated, for example, only a continuous repetition such as LLL is generated, as shown in Eq. 5. A more uniform optical performance can therefore be expected by using a sequence-generating method.

L and S are described above as basic units. These units can be generated so that L={A, B, C} and S={B, C, B}, as already described above. In this case, an optical element comprising the basic units A, B, and C can ultimately be obtained.

Described above is an array of basic units in a single direction. An optical element in which the basic units are arrayed in one direction can be obtained using two sheets so that the single directions intersect. In this case, an optical element having a two-dimensional array can be obtained with the aid of two sheets. In other words, louvers that operate in a two direction can be fabricated by intersecting and laminating two pairs of the above-described microlouvers. In this case, the range of viewing angles can be limited in both the vertical and horizontal directions of the screen because the screen has a microlouver layer in which the light-absorbing layers extend in the X direction, and a microlouver layer in which the light-absorbing layers extend in the Y direction, which is orthogonal to the X direction. In this case as well, Moire fringes caused by the pitch of the pixels in the liquid crystal display panel do not occur.

Figure 14:
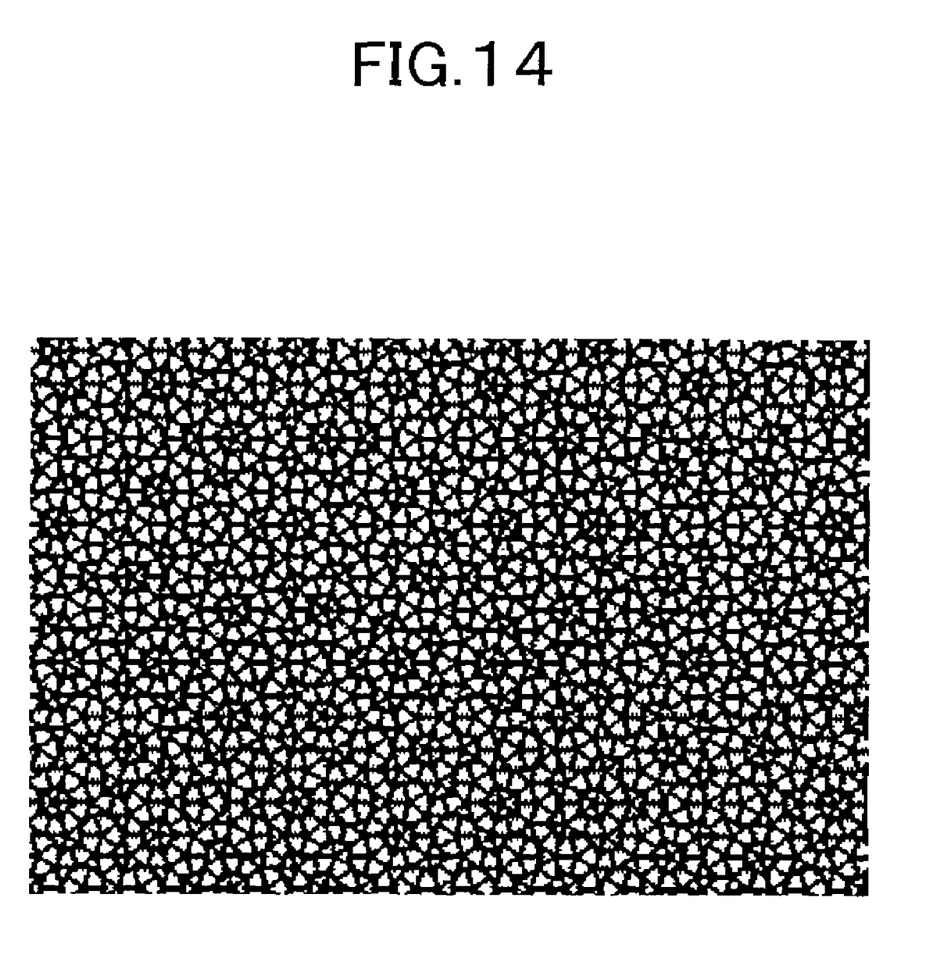
FIG. 14 is a plan view of another optical element in which a light control portion comprising a two-dimensional light absorption layer and transparent layer is used as the basic unit.
Figure 15:
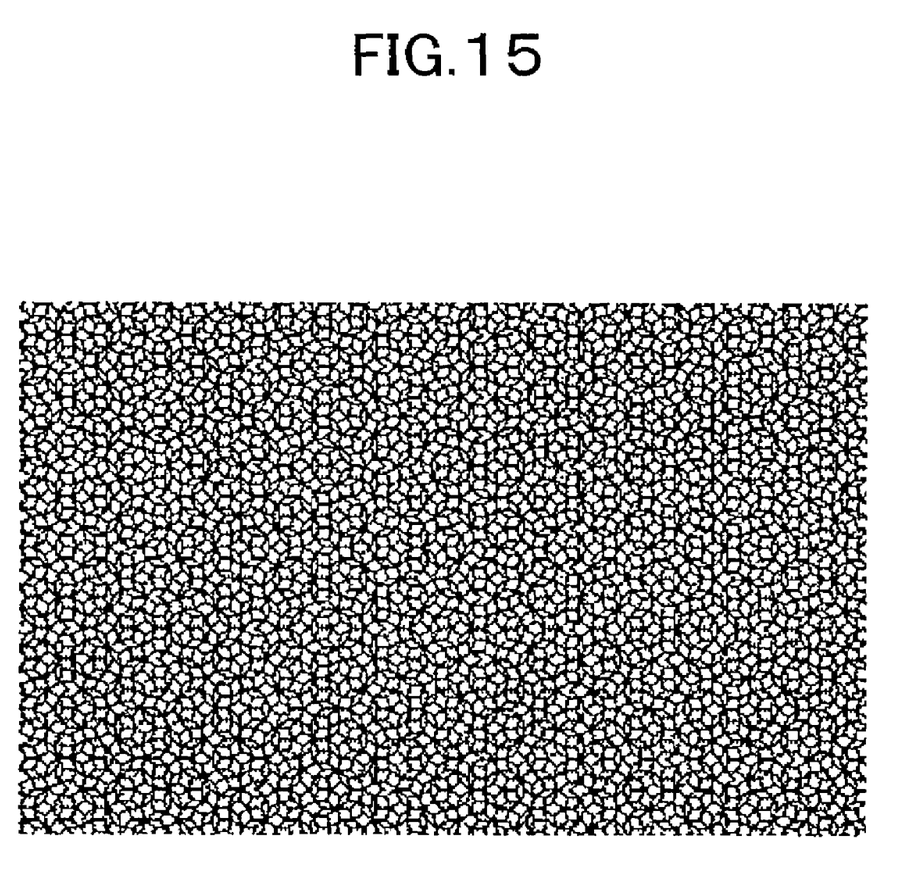
FIG. 15 is a plan view of another optical element in which a light control portion comprising a two-dimensional light absorption layer and transparent layer is used as the basic unit.

A non-periodic two-dimensional filler algorithm can also be used. An example is a tile pattern known as a Penrose tile such as that shown in FIGS. 14 and 15. In this case as well, a non-periodic structure can be obtained in two directions. In FIGS. 14 and 15, a two-dimensional space can be filled without periodicity with two types of patterns. The same effect as that provided by the optical elements described above can be obtained even when a two-dimensional filler algorithm such as that described above is used. In this case, a basic unit can be composed of a minimal number of two types. If the basic units are small, the optical performance in the plane of the optical element can be made uniform.

Figure 16:
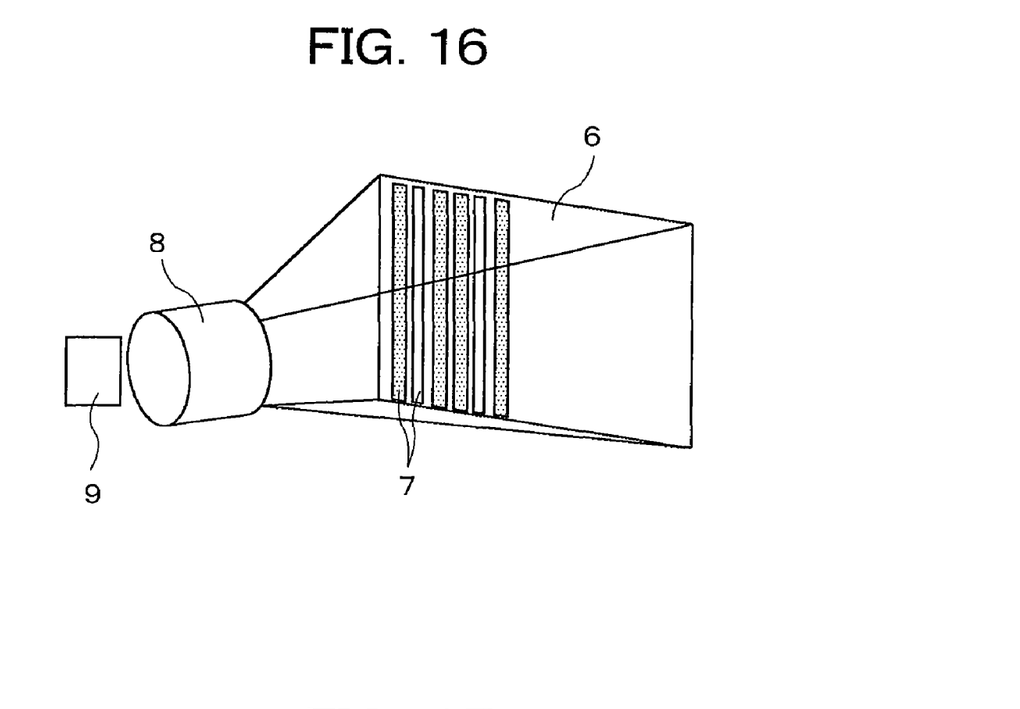
FIG. 16 is a view showing the optical device according to another embodiment of the present invention.

FIG. 16 shows an optical screen that uses the optical device according to the embodiments of the present invention. FIG. 16 shows a configuration in which basic units 7 having two types of Fresnel lens shapes are arrayed in a single direction on the substrate of an optical screen 6, for example. A display image is formed by passing light from a light source (not shown) through a liquid crystal panel 9, and the display image is projected on the optical screen 6 with the aid of a projection lens 8. The display image has a constant pixel pitch determined by the liquid crystal panel 9, but Moire fringes do not occur because the basic units 7 of the Fresnel lenses constituting the optical screen 6 have an irregular pitch.

Figure 17:
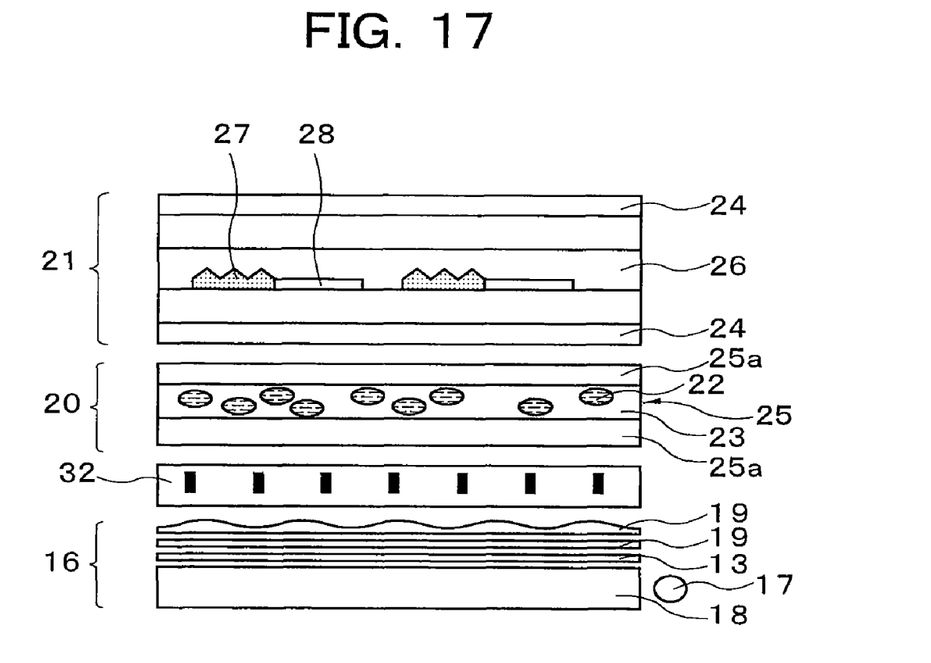
FIG. 17 is cross-sectional view showing the optical device according to yet another embodiment of the present invention.

FIG. 17 is cross-sectional view of a semitransparent liquid crystal display apparatus according to another embodiment of the present invention. In the present embodiment, a microlouver 32 is disposed on a backlight light source 16, a transparent/scattering switching element 20 is disposed on the microlouver 32, and a liquid crystal display panel 21 is disposed on the transparent/scattering switching element 20. The backlight light source 16 is a sidelight, and a cold-cathode tube or another light source 17 is disposed beside the light guide plate 18. Light incident from the light source 17 to the light guide plate 18 enters the diffusion plate 13 from the surface of the light guide plate 18. Furthermore, light from the diffusion plate 13 is formed into planar light via a prism sheet 19 and is emitted by the backlight light source 16. In the case of a sidelight, the distribution characteristics of light from the surface of the light guide plate 18 in the vicinity of the light source 17 are different than the distribution characteristics of light from the surface of the light guide plate 18 far away from the light source 17. For this reason, the diffusion plate 13 is disposed on the light guide plate 18 in order to allow the distribution characteristics of light from the light guide plate 18 to be made uniform. The backlight light source 16 can thereby be handled as a planar light source of uniformly diffused light. Furthermore, a light source in which the directivity of diffused light is increased can be obtained by disposing a prism sheet 19. Preferably used in this case is a prism sheet 19 having a regular period.

The microlouver 32 is disposed on the surface of the backlight light source 16 in such a planar light source. The microlouver 32 is fabricated in accordance with the above-described sequence-generating rule. For this reason, the microlouver 32 has an internal array of basic units such as LSLLSLSL . . . as expressed in Eq. 6. The directivity of the light distribution characteristics can be further increased by using the microlouver 32. The range of the light ray angles of the microlouver 32 can be adjusted with the aid of the design parameters of the microlouver described above.

A transparent/scattering switching element 20 is disposed directly above the microlouver 32. The transparent/scattering switching element 20 has polymer-dispersed liquid crystal (PDLC) 25 in which a liquid crystal polymer 22 is dispersed in polymer material 23, and voltage is applied to the polymer-dispersed liquid crystal 25 by way of a transparent electrode 25a overlaid on the front and reverse surfaces of the polymer-dispersed liquid crystal 25. The transparent state or scattering state of the polymer-dispersed liquid crystal 25 can be selected by the application or non-application of voltage to the polymer-dispersed liquid crystal 25.

The liquid crystal display panel 21 has a liquid crystal layer 26 disposed between two polarizing plates 24, and a reflective region 27 and transparent region 28 are disposed in the liquid crystal layer 26. The liquid crystal display panel is thus not limited to a semitransparent liquid crystal display panel having a reflective region 27 and a transparent region 28, and a transparent liquid crystal display panel or the like can also be used as the liquid crystal display panel 21.

In the liquid crystal display apparatus of the present embodiment, a moire or other phenomenon does not occur when the transparent/scattering switching element 20 is in a scattering state. However, when the transparent/scattering switching element 20 is in a transparent state, Moire fringes generally tend to occur between the prism sheet 19 and the liquid crystal display panel 21. In the present embodiment, however, the microlouver 32 is produced in accordance with the above-described sequence-generating rule, and Moire fringes do not occur because the microlouver 32 has an internal array of basic units such as LSLLSLSL . . . , as expressed in Eq. 6. Hence, Moire fringes do not occur in the present embodiment regardless of whether the transparent/scattering switching element 20 is in a scattering state or in a transparent state.

After having passed through the microlouver 32, light from the backlight light source 16 has the distribution characteristics of collimated light. When the light-absorbing layer of the microlouver 32 extends in the vertical direction of the diagram, light that has passed through the microlouver 32 is collimated in the horizontal direction of the diagram, and light collimated in the horizontal direction enters the PDLC 25 above the microlouver 32. The PDLC 25 can be electrically switched between a transparent state and a scattering state. When the PDLC 25 is in a transparent state, the collimated light from the microlouver 32 travels directly forward without being scattered and enters the liquid crystal display panel 21. For this reason, display information does not reach an observer positioned in the horizontal direction of the diagram, and the display information can be viewed only in a narrow range of viewing angles.

In contrast, when the PDLC 25 is in a scattering state, the collimated light from the microlouver 32 is considerably scattered. For this reason, the display information produced on the liquid crystal display panel 21 can be distributed over a wide viewing range. Observers positioned in the horizontal direction of the diagram can therefore view the display information.

Thus, in accordance with the present embodiment, the viewing angle can be narrowed by the application or non-application of voltage to the PDLC 25, persons in the vicinity can be prevented from viewing the display content, and the occurrence of Moire fringes can be prevented.

What is claimed is:

1. An optical element, comprising:
   a light-controlling layer in which a light-absorbing layer and a transparent layer are laminated together as a basic unit;
   a plurality of basic units comprising a plurality of types of light-controlling layers having different layer thicknesses or optical constants, disposed in the direction of the layer thickness; and
   front and back surfaces disposed in the direction orthogonal to said layer thickness direction and used as light incident and excident planes, wherein
   said plurality of basic units, to which a number is assigned, are arrayed based on a sequence, whereby basic units having different thicknesses or optical constants are arranged in a non-periodic manner.

2. An optical element, comprising:
a light-controlling layer in which a light-absorbing layer and a transparent layer are laminated together as a basic unit;
a plurality of basic units comprising a plurality of types of light-controlling layers having different layer thicknesses or optical constants, disposed in the direction of the layer thickness; and
front and back surfaces disposed in the direction orthogonal to said layer thickness direction and used as light incident and excident planes, wherein
said plurality of basic units, to which a number is assigned, are arrayed based on a random number, whereby basic units having different thicknesses or optical constants are arranged in a non-periodic manner.

3. An optical element, comprising:
a light-controlling portion comprising a two-dimensional shape composed of a light-absorbing layer and a transparent layer as a basic unit;
a plurality of basic units comprising a plurality of types of light-controlling portions having different sizes or optical constants, arranged on a flat surface orthogonal to said two-dimensional shape on the basis of a non-periodic two-dimensional filler algorithm; and
front and back surfaces disposed in the direction parallel to said flat surface and used as light incident and excident planes.

4. An optical device, in which the optical element according to claim 1 and an optical element having a periodic light-controlling layer or light-controlling portion are laminated.

5. An optical device, in which the optical element according to claim 3 and an optical element having a periodic light-controlling layer or light-controlling portion are laminated.

6. An optical device, comprising:
an optical element including:
a light-controlling layer in which a light-absorbing layer and a transparent layer are laminated together as a basic unit;
a plurality of basic units comprising a plurality of types of light-controlling layers having different layer thicknesses or optical constants, disposed in the direction of the layer thickness;
front and back surfaces disposed in the direction orthogonal to said layer thickness direction and used as light incident and excident planes, wherein an array mode of said plurality of basic units is determined based on a sequence-generating rule; and
a spatial optical modulator having a periodic pixel structure in which the optical elements are laminated together.

7. An optical device, comprising:
the optical element according to claim 3 and,
a spatial optical modulator having a periodic pixel structure in which the optical elements are laminated together.

8. An optical device, comprising:
an optical screen comprising the optical elements according to claim 1 and,
a spatial optical modulator having a periodic pixel structure in which the emitted light thereof is projected on the optical screen.

9. An optical device, comprising:
an optical screen comprising the optical elements according to claim 3 and,
a spatial optical modulator having a periodic pixel structure in which the emitted light thereof is projected on the optical screen.

10. An optical device comprising:
a transparent/scattering switching element inserted between a microlouver of an optical element, the optical element including:
a light-controlling layer in which a light-absorbing layer and a transparent layer are laminated together as a basic unit:
a plurality of basic units comprising a plurality of types of light-controlling layers having different layer thicknesses or optical constants, disposed in the direction of the layer thickness; and
front and back surfaces disposed in the direction orthogonal to said layer thickness direction and used as light incident and excident planes, wherein an array mode of said plurality of basic units is determined based on a sequence-generating rule; and
a spatial light modulator having a periodic pixel structure.

11. An optical device, wherein a transparent/scattering switching element is inserted between the microlouver of the optical element according to claim 3 and a spatial light modulator having a periodic pixel structure.

12. An information terminal comprising:
an optical device in which a first optical element and a second optical element having, a periodic light-controlling layer or lioht-controlling portion are laminated, the optical device beings mounted in the information terminal, the first optical element including:
a light-controlling layer in which a light-absorbing layer and a transparent layer are laminated together as a basic unit;
a plurality of basic units comprising a plurality of types of light-controlling layers having different layer thicknesses or optical constants, disposed in the direction of the layer thickness; and
front and back surfaces disposed in the direction orthogonal to said layer thickness direction and used as light incident and excident planes, wherein an array mode of said plurality of basic units is determined based on a sequence-generating rule.

13. An information terminal, wherein the optical device according to claim 5 is mounted in the mobile information terminal.

14. An information terminal, wherein the optical device according to claim 6 is mounted in the mobile information terminal.

15. An information terminal, wherein the optical device according to claim 7 is mounted in the mobile information terminal.

16. An information terminal comprising:
an optical device having an optical screen comprising optical elements and a spatial optical modulator having a periodic pixel structure in which the emitted light thereof is projected on the optical screen, the optical device being mounted in the information terminal, the optical elements comprising:
a light-controlling layer in which a light-absorbing layer and a transparent layer are laminated together as a basic unit:
a plurality of basic units comprising a plurality of types of light-controlling layers having different layer thicknesses or optical constants, disposed in the direction of the layer thickness; and
front and back surfaces disposed in the direction orthogonal to said layer thickness direction and used as light incident and excident planes, wherein an array mode of said plurality of basic units is determined based on a sequence-generating rule.

17. An information terminal, wherein the optical device according to claim 9 is mounted in the mobile information terminal.

18. An information terminal, wherein the optical device according to claim 10 is mounted in the mobile information terminal.

19. An information terminal, wherein the optical device according to claim 11 is mounted in the mobile information terminal.

20. A method of manufacturing a microlouver, comprising:
    forming, as a basic unit, a light-controlling layer in which a light-absorbing layer and a transparent layer are laminated together;
    laminating a plurality of basic units, each comprising a plurality of types of light-controlling layers that have different layer thicknesses, in an array mode determined based on a sequence-generating rule in the layer thickness direction thereof to form a block body; and
    making the film thinner by slicing the block body in the direction orthogonal to said layer thickness direction.

21. A method of manufacturing a microlouver, comprising:
    forming, as a basic unit, a light-controlling layer in which a light-absorbing layer and a transparent layer are laminated together;
    laminating a plurality of basic units, each comprising a plurality of types of light-controlling layers that have different layer thicknesses, in an array mode determined based on a random number in the layer thickness direction thereof to form a block body; and
    making the film thinner by slicing the block body in the direction orthogonal to said layer thickness direction.

* * * * *